United States Patent
Suzuki et al.

(10) Patent No.: US 7,055,351 B2
(45) Date of Patent: Jun. 6, 2006

(54) ELECTRICALLY-DRIVEN STEERING LOCK DEVICE

(75) Inventors: Noriyuki Suzuki, Aichi-ken (JP); Masanari Okuno, Aichi-ken (JP); Tomohiro Fukatsu, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 185 days.

(21) Appl. No.: 10/760,413

(22) Filed: Jan. 21, 2004

(65) Prior Publication Data

US 2004/0148983 A1    Aug. 5, 2004

(30) Foreign Application Priority Data

Jan. 31, 2003    (JP)    ............................. 2003-024681

(51) Int. Cl.
  *B60R 25/02*    (2006.01)
(52) U.S. Cl. .......................................... 70/186; 70/252
(58) Field of Classification Search .......... 70/182–186, 70/252, 416, 420–422; 292/DIG. 66
  See application file for complete search history.

(56) References Cited

U.S. PATENT DOCUMENTS

| | | | | | |
|---|---|---|---|---|---|
| 2,767,011 | A | * | 10/1956 | Buckley | 292/341.16 |
| 3,641,489 | A | * | 2/1972 | Shimomura | 340/457 |
| 4,332,306 | A | * | 6/1982 | Turatti | 180/287 |
| 4,466,262 | A | * | 8/1984 | Maiocco et al. | 70/252 |
| 5,527,074 | A | * | 6/1996 | Yeh | 292/177 |
| 5,588,686 | A | * | 12/1996 | Riley et al. | 292/92 |
| 5,690,371 | A | * | 11/1997 | Turnbull | 292/163 |
| 5,718,132 | A | * | 2/1998 | Riefe et al. | 70/186 |
| 5,794,469 | A | * | 8/1998 | Suzuki | 70/252 |
| 6,035,675 | A | * | 3/2000 | Zimmer et al. | 70/186 |
| 6,125,671 | A | * | 10/2000 | Suzuki | 70/186 |
| 6,295,848 | B1 | * | 10/2001 | Suzuki | 70/186 |
| 6,327,882 | B1 | * | 12/2001 | Canard | 70/186 |
| 6,354,117 | B1 | * | 3/2002 | Canard | 70/186 |
| 6,439,011 | B1 | * | 8/2002 | Frick et al. | 70/185 |
| 6,516,640 | B1 | * | 2/2003 | Jacobs et al. | 70/186 |
| 6,539,756 | B1 | * | 4/2003 | Bartels et al. | 70/186 |
| 6,647,751 | B1 | * | 11/2003 | Zillmann | 70/186 |
| 6,748,774 | B1 | * | 6/2004 | Dubay et al. | 70/187 |

(Continued)

FOREIGN PATENT DOCUMENTS

JP    7-9944    1/1995

(Continued)

*Primary Examiner*—Suzanne Dino Barrett
(74) *Attorney, Agent, or Firm*—Nixon Peabody LLP

(57) ABSTRACT

An electrically-driven steering lock device is provided having a lock body that, if broken while a vehicle is parked, the lock body is divided into a main body portion and a guide portion. A lock pin is inserted through a through-hole of a movable plate and fits into a fit-in hole formed in a lock stopper such that movement of the lock stopper is impeded. A locked state of a steering shaft is thereby maintained. Further, movement of the movable plate in a direction of being pulled-out also is impeded by the lock pin, and an interior of the guide portion is prevented from being exposed. Moreover, the lock pin is provided within the guide portion, and even if the guide portion is viewed from an exterior, it is difficult to learn of a mechanism and a position of the lock pin. Therefore, it is difficult to cancel a locked state. Thus an electrically-driven steering lock device is provided in which it is difficult to cancel the locked state by an illegal act, and which has a good antitheft quality.

20 Claims, 10 Drawing Sheets

U.S. PATENT DOCUMENTS

| | | | |
|---|---|---|---|
| 6,755,058 B1* | 6/2004 | Zillmann | 70/252 |
| 6,915,671 B1* | 7/2005 | Zillmann | 70/186 |
| 2001/0025516 A1* | 10/2001 | Starken | 70/186 |
| 2004/0040354 A1* | 3/2004 | Linkenbach et al. | 70/186 |
| 2004/0182121 A1* | 9/2004 | Fukatsu et al. | 70/186 |
| 2004/0250577 A1* | 12/2004 | Watanuki et al. | 70/186 |
| 2004/0251671 A1* | 12/2004 | Zillmann | 280/775 |

FOREIGN PATENT DOCUMENTS

| | | | |
|---|---|---|---|
| JP | 2000-225922 | * | 8/2000 |

* cited by examiner

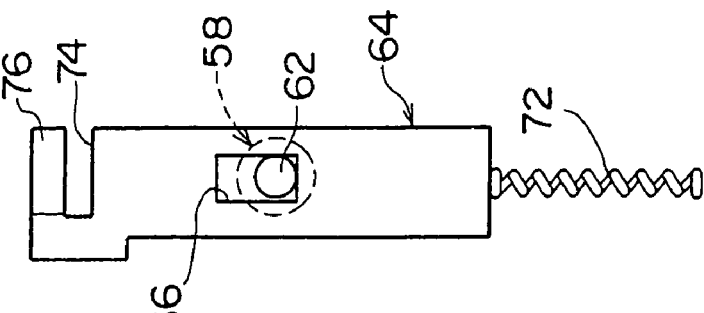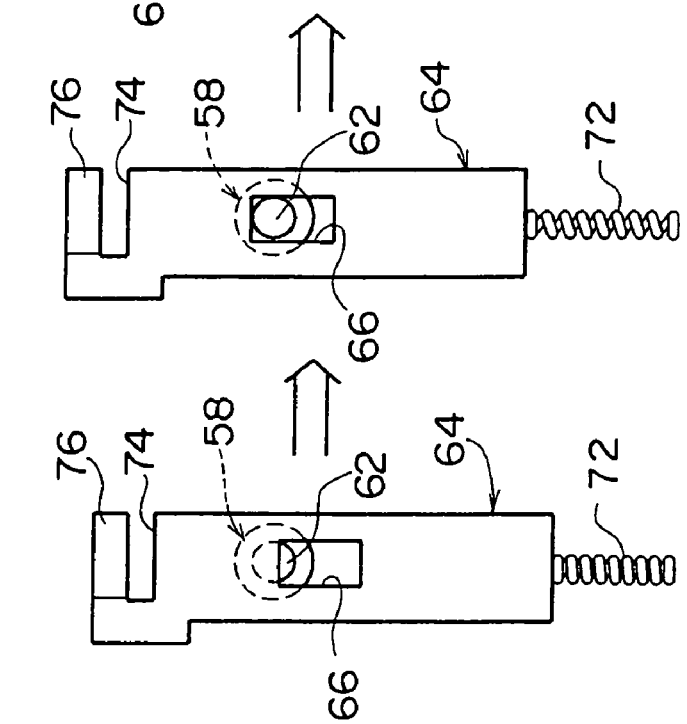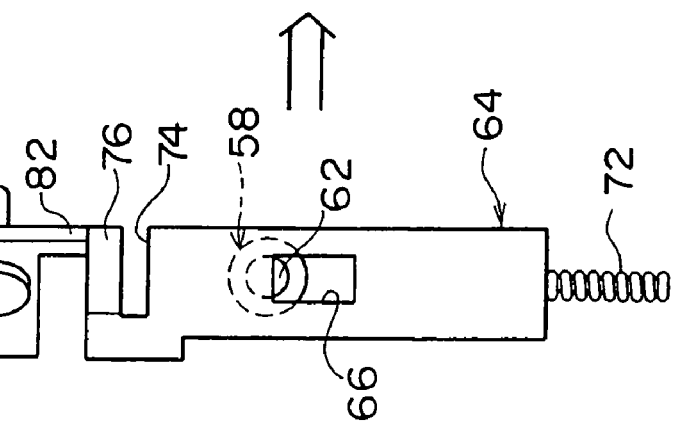

ELECTRICALLY-DRIVEN STEERING LOCK DEVICE

CROSS-REFERENCE TO RELATED APPLICATION

This application claims priority under 35 USC 119 from Japanese Patent Application No. 2003-24681, the disclosures of which are incorporated by reference herein.

BACKGROUND OF THE INVENTION

1. Field of the Invention

The present invention relates to an electrically-driven steering lock device which is applied to a vehicle such as an automobile or the like.

2. Description of the Related Art

Vehicles such as automobiles and the like are equipped with, for example, a so-called electrically-driven steering lock device as an antitheft device. The electrically-driven steering lock device has, for example, a lock body which is assembled to the steering post of a vehicle. The lock body has a main body portion, which houses a driving means, and a guide portion, which is tubular and projects from the main body portion toward the steering shaft. The main body portion and the guide portion are integral. Within the main body portion, a cam portion is connected to a motor which is the driving means. The cam portion rotates in accordance with the forward and reverse rotation of the motor. A lock stopper and a lock bar are disposed within the tube of the guide portion. The lock stopper is movable in accordance with the rotation of the cam portion, and is urged by a spring toward the steering shaft. One end portion of the lock bar is engaged with the lock stopper.

In an electrically-driven steering lock device having the above-described structure, the distal end portion of the lock bar projects toward the steering shaft and locks the steering shaft such that rotation thereof is not possible. The lock stopper and the lock bar are moved by the cam portion in the direction opposite the steering shaft against the urging force of the spring, such that the engagement of the lock bar with the steering shaft is cancelled.

On the other hand, among usual steering lock devices which are operated by a key, there is a type which has basically the same structure as that of the above-described electrically-driven steering lock device. In this steering lock device, a key cylinder in which a key is inserted is housed in the main body portion. A cam portion of a cam shaft is rotated by the operation of rotating the key which is inserted in the key cylinder. Then, in accordance with the rotation of the cam portion, the lock stopper and the lock bar move within the tube of the guide portion.

At times such as when the vehicle suddenly decelerates or the like, the knee of the driver may strongly hit the main body portion or the guide portion of the lock body, and receive a great impact. Therefore, the applicant of the present application has proposed a steering lock device in which, when the main body portion or the guide portion of the lock body receives an impact force of a predetermined value or more, the intermediate portion of the guide portion breaks, and the impact which the driver receives is thereby lessened (see Japanese Patent Application Laid-Open (JP-A) No. 7-9944).

Moreover, the steering lock device disclosed in JP-A No. 7-9944, is provided with an impeding means such that, accompanying the breaking of the guide portion of the lock body, the engagement of the lock stopper and the lock bar is cancelled, the lock bar becomes able to move, and locking of the steering shaft of the vehicle which is in the midst of traveling is impeded. Namely, an engaging member, which is urged toward the lock bar and whose movement is restricted at usual times, is provided at the distal end side of the guide portion. Accompanying the breaking of the intermediate portion of the guide portion, this restriction is cancelled, and the engaging member is moved and made to engage with an engaging portion provided at the lock bar. Movement of the lock bar is thereby restricted.

In accordance with this structure, in cases in which the lock body is broken due to an illegal act when the vehicle is parked, movement of the lock bar can be restricted by the engaging member, and it is possible to maintain the state in which the steering shaft is locked by the lock bar (a so-called "dead locking mechanism").

However, in the above-described steering lock device disclosed in JP-A No. 7-9944, the engaging member and the restricting member which restricts movement of the engaging member are exposed at the exterior of the lock body. Therefore, there is the concern that the engagement of the engaging member with the lock bar can be impeded by fixing the engaging member in advance before breaking the lock body.

Thus, the applicant of the present application has proposed a steering lock device whose antitheft quality is improved by providing such an engaging member and restricting member at the interior of the lock body (refer to JP-A No. 2000-225922).

In this steering lock device disclosed in JP-A No. 2000-225922, a cam shaft is provided within the guide portion. When the lock body is broken, the main body portion and the guide portion are divided. Movement of the engaging member is restricted by a restricting member which is disposed between the guide portion and the cam shaft and whose one end is fixed to the main body portion. Therefore, accompanying the division of the main body portion and the guide portion, the restricting member is eliminated. Therefore, the engaging member moves toward the cam shaft and engages with an engaging hole provided in the cam shaft. Movement of the cam shaft, the lock stopper, and the lock bar is thereby restricted.

However, in the above-described steering lock device disclosed in JP-A No. 2000-225922, because the restricting member is cleared away together with the main body portion as the main body portion and the guide portion are divided, a gap forms between the guide portion and the cam shaft. Therefore, there is the possibility that the position of the engaging member will be specified from this gap, and that the engaging member which is engaged with the cam shaft may be removed in some way. Thus, there is the need for a countermeasure to prevent such a situation from occurring.

SUMMARY OF THE INVENTION

In view of the aforementioned, an object of the present invention is to provide an electrically-driven steering lock device in which the locked state of a steering shaft can be reliably maintained even if a lock body is broken while a vehicle is parked, and in which cancellation of this locked state due to an illegal act is difficult, and which has an improved antitheft quality.

In order to achieve the above object, a first aspect of the present invention is an electrically-driven steering lock device comprising: a lock body having a main body portion in which a drive source is accommodated, and a guide portion which is tubular and which projects from the main body portion toward a steering shaft of a vehicle; a connecting portion enabling the lock body to divide when impact of a predetermined value or more is applied to the lock body; a lock stopper moving due to driving force from the drive source; a lock bar which is provided so as to be integrally movable with the lock stopper within the guide portion and whose proximal end portion is connected to the lock stopper, and in a state in which the lock stopper has been moved toward a guide portion side of the lock body, a distal end portion of the lock bar projects toward the steering shaft from a distal end of the guide portion and locks the steering shaft, and in a state in which the lock stopper has been moved toward a main body portion side of the lock body, the distal end portion of the lock bar moves in a direction opposite to the steering shaft and releases locking of the steering shaft; a lock plate having a through-hole, and provided between the guide portion and the lock stopper so as to be movable toward the main body portion, and urged by an urging means toward the main body portion side, and at usual times, movement of the lock plate toward the main body portion side is impeded due to the lock plate abutting the main body portion; a lock pin provided at the guide portion so as to be movable in a direction intersecting a direction of movement of the lock stopper, and urged toward the lock stopper by an urging means, movement of the lock pin toward the lock stopper being impeded due to the lock pin abutting an edge of the through-hole of the lock plate; and a fit-in concave portion formed at a position of the lock stopper which position faces the lock pin across the lock plate in a state in which the lock stopper has been moved toward the guide portion side of the lock body, the lock pin being able to fit in the fit-in concave portion.

In the electrically-driven steering lock device of the first aspect, when the vehicle is parked, the lock stopper is moved toward the guide portion side of the lock body. The distal end portion of the lock bar thereby projects out from the distal end of the guide portion, and locks the steering shaft.

In this locked state, when the lock body is broken by an illegal act and impact of a predetermined value or more is applied to the lock body, the lock body is divided with the connecting portion being the starting point of this division.

Therefore, the lock plate, whose movement toward the main body portion side has been impeded by the main body portion, moves due to the urging force of the urging means. Then, the lock pin, which is urged toward the lock stopper by the urging means and whose movement has been impeded due to the lock pin abutting the edge of the through-hole formed in the lock plate, is inserted through the through-hole of the lock plate and fits into the fit-in concave portion formed in the lock stopper. Because movement of the lock stopper is thereby impeded, movement of the lock bar, whose proximal end portion is connected to the lock stopper, also is impeded.

Accordingly, even if the lock body is broken by an illegal act while the vehicle is parked, it is possible to prevent the locking of the steering shaft from being cancelled.

Moreover, the lock pin is fit in the fit-in concave portion of the lock stopper in the state in which the lock pin is inserted through the through-hole of the lock plate. Therefore, movement of the lock plate with respect to the guide portion also is limited, and the lock plate can reliably be prevented from being pulled-out from the guide portion. Further, the region between the guide portion and the lock stopper is blocked by the lock plate. Therefore, it is difficult to break the lock pin from between the guide portion and the lock stopper and to release the locking of the steering shaft, and the antitheft quality improves.

In this way, in accordance with the electrically-driven steering lock device of the first aspect, if the lock body is broken while the vehicle is parked, the locked state of the steering shaft is reliably maintained. Further, it is difficult to cancel this locked state by an illegal act, and the antitheft quality is good.

In a second aspect of the present invention, in the electrically-driven steering lock device based on the first aspect, the lock plate and the urging means for urging the lock plate, and the lock pin and the urging means for urging the lock pin, are provided at the interior of the guide portion in a state of not being exposed.

In the electrically-driven steering lock device based on the second aspect, the lock pin, the lock plate and the urging means for urging the lock pin and the lock plate are provided at the interior of the guide portion in a state of not being exposed. Therefore, it is difficult to learn, from the exterior, of the mechanism and the position of the lock plate and the lock pin.

Moreover, even when an impact of a predetermined value or more is applied to the lock body, such as by a burglar or the like, and the lock body is divided, the region between the guide portion and the lock stopper is closed off by the lock plate such that the interior of the guide portion is not exposed. Therefore, it is difficult to learn of the mechanism and the position of the lock pin.

On the other hand, even if the position of the lock pin is specified, it is not possible to cancel the state in which the steering shaft is locked by the lock bar unless the guide portion (which is generally formed of metal) is broken and the lock pin is removed from the fit-in concave portion of the lock stopper. Therefore, quite a long period of time would be required in order to cancel the locked state, and the antitheft quality is improved even more.

In this way, in accordance with the electrically-driven steering lock device based on the second aspect, the antitheft quality when the vehicle is parked is further improved.

In a third aspect of the present invention, the lock stopper in the electrically-driven steering lock devices based on the above-described aspects has another fit-in concave portion formed at a position of the lock stopper which position faces the lock pin across the lock plate when the lock stopper has been moved toward the main body portion side of the lock body, such that the lock pin can fit in the other fit-in concave portion.

In the electrically-driven steering lock device based on the third aspect, when the vehicle is traveling, due to the lock stopper being moved toward the main body portion side of the lock body, the distal end portion of the lock bar moves in the direction opposite the steering shaft, and locking of the steering shaft is released.

In this state in which the locking is released, when the knee or the like of a vehicle occupant collides with the lock body as the vehicle is suddenly braked, and an impact of a predetermined value or more is applied to the lock body, the lock body is divided with the connecting portion being the starting point of the division. In this way, the impact which the knee or the like of the vehicle occupant receives from the lock body is mitigated.

Moreover, at this time, the lock plate, whose movement toward the main body portion side has been impeded by the main body portion, moves due to the urging force of the urging means. Then, the lock pin, which is urged toward the lock stopper by the urging means and whose movement has been impeded due to the lock pin abutting the edge of the through-hole formed in the lock plate, is inserted through the through-hole of the lock plate, and fits into another fit-in concave portion formed in the lock stopper. Because movement of the lock stopper is thereby impeded, movement of the lock bar, whose proximal end portion is connected to the lock stopper, also is restricted.

Accordingly, even if the lock body is broken while the vehicle is traveling, the steering shaft is prevented from being locked by the lock bar.

In this way, in accordance with the electrically-driven steering lock device based on the third aspect, if the lock body breaks while the vehicle is traveling, the unlocked state of the steering shaft is reliably maintained, and the safety while the vehicle is traveling is improved.

In the fourth aspect of the present invention, the lock stopper in the electrically-driven steering lock devices of the above-described aspects has a brittle portion provided at a position corresponding to the connecting portion of the electrically-driven steering lock device, the brittle portion enabling the lock stopper itself to divide at a time when the lock body divides.

In the electrically-driven steering lock device based on the fourth aspect, when impact of a predetermined value or more is applied to the lock body and the lock body is divided with the connecting portion being the starting point of the division, the lock stopper itself is divided with the brittle portion, which is provided at a position corresponding to the connecting portion, being the starting point of the division.

In this way, in a state in which the lock body is broken by an illegal act and movement of the lock stopper is impeded by the lock pin, it is difficult to nip the lock stopper. Therefore, it is possible to prevent the lock stopper from being forcibly pulled out and the locking from being cancelled.

Moreover, when the knee or the like of a vehicle occupant collides with the lock body while the vehicle is traveling, the knee or the like of the vehicle occupant is prevented from receiving impact from the lock stopper, and the safety of the vehicle occupant is further improved.

In this way, in accordance with the electrically-driven steering lock device based on the fourth aspect, it is possible to even further improve the antitheft quality while the vehicle is parked and the safety while the vehicle is traveling.

In a fifth aspect of the present invention, the lock plate in the electrically-driven steering lock devices based on the above-described aspects is structured so as to be divided into a fixed plate which is fixed to the main body portion, and a movable plate which has the through-hole in a central portion thereof, and which is provided so as to be movable toward the fixed plate between an inner wall of the guide portion and the lock stopper, and which is urged toward the fixed plate by the urging means, and movement of the movable plate toward the fixed plate is impeded due to an edge of the movable plate engaging with an edge of the fixed plate at a position corresponding to the connecting portion of the lock body.

In the electrically-driven steering lock device based on the fifth aspect, the edge of the fixed plate which is fixed to the main body portion engages with the edge of the movable plate which is provided at the guide portion. In this way, movement of the movable plate toward the fixed plate is impeded, and it is easy for the engagement of the movable plate and the fixed plate to be cancelled. The fixed plate and the movable plate are engaged at a position corresponding to the connecting portion of the lock body.

Therefore, even if impact is applied to the lock body and a slight crack is formed in the connecting portion, the engagement of the fixed plate and the movable plate is cancelled such that the movable plate moves, and the lock pin also moves and impedes movement of the lock stopper. Namely, even in the state in which the main body portion and the guide portion are not completely divided, movement of the lock stopper and the lock bar is reliably impeded. Therefore, the antitheft quality while the vehicle is parked and the safety while the vehicle is traveling are further improved.

In this way, in accordance with the electrically-driven steering lock device based on the fifth aspect, the antitheft quality while the vehicle is parked and the safety while the vehicle is traveling are further improved.

BRIEF DESCRIPTION OF THE DRAWINGS

FIGS. 8A through 8D illustrate processes of the operation of the lock plate and the lock pin which are structural members of the electrically-driven steering lock device relating to the embodiment of the present invention, where FIG. 8A is a front view showing a state before breakage of a lock body, FIG. 8B is a front view showing a state at the instant when the lock body breaks and a main body portion and a guide portion are divided, FIG. 8C is a front view showing a state in which the lock plate is moving, and FIG. 8D is a front view showing a state in which the lock pin is inserted through a through-hole of the lock plate.

DETAILED DESCRIPTION OF THE INVENTION

Figure 1:
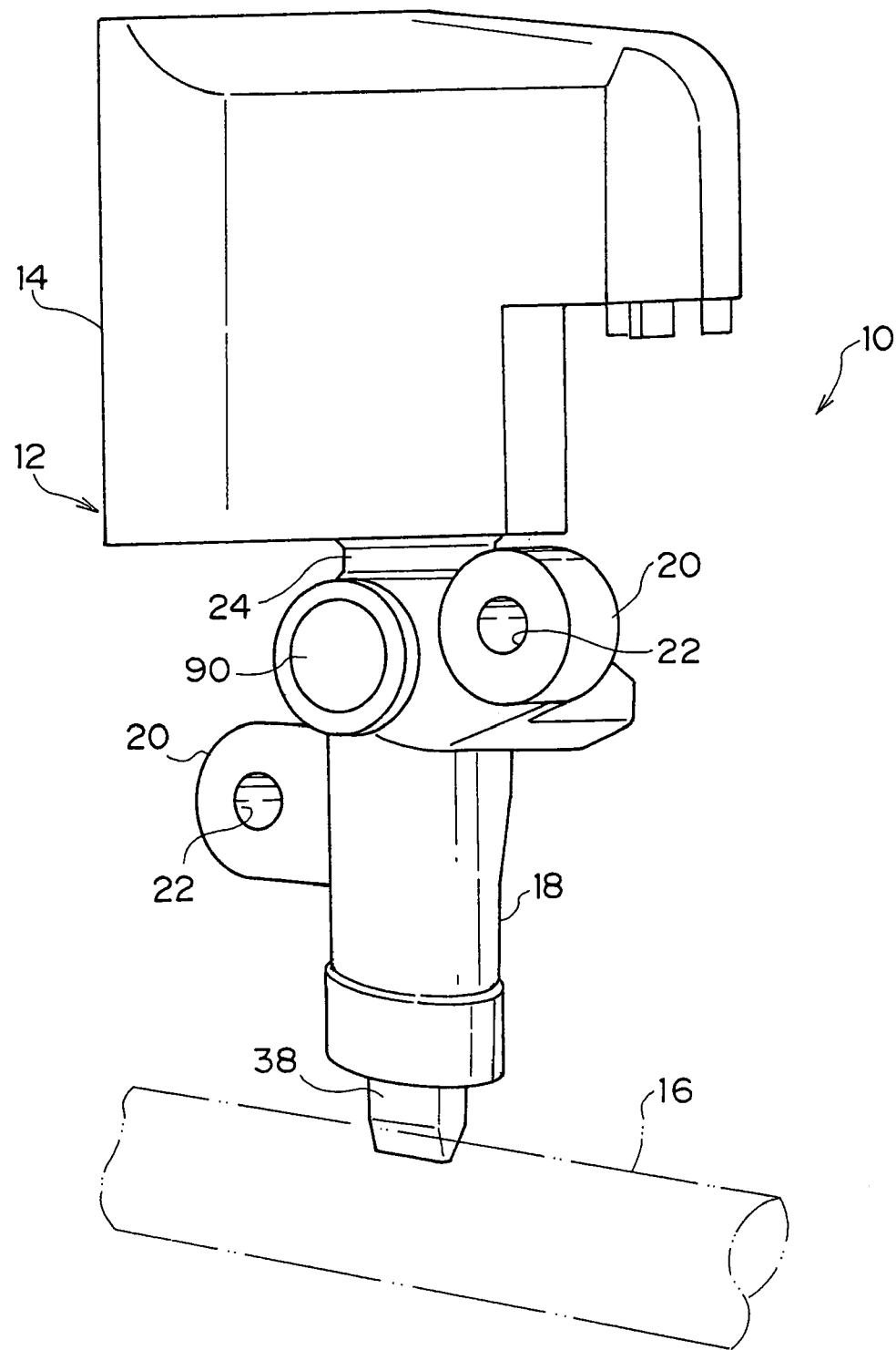
FIG. 1 is a perspective view showing the overall structure of an electrically-driven steering lock device relating to an embodiment of the present invention.

The structure of an electrically-driven steering lock device 10 relating to an embodiment of the present invention is shown in a perspective view in FIG. 1.

The electrically-driven steering lock device 10 has a lock body 12 mounted to the steering post (not illustrated) of a vehicle. The lock body 12 is formed of a metal, and has a box-shaped main body portion 14 and a tubular guide portion 18 which projects from the main body portion 14 toward a steering shaft 16. The main body portion 14 and the guide portion 18 are integral.

Figure 2:
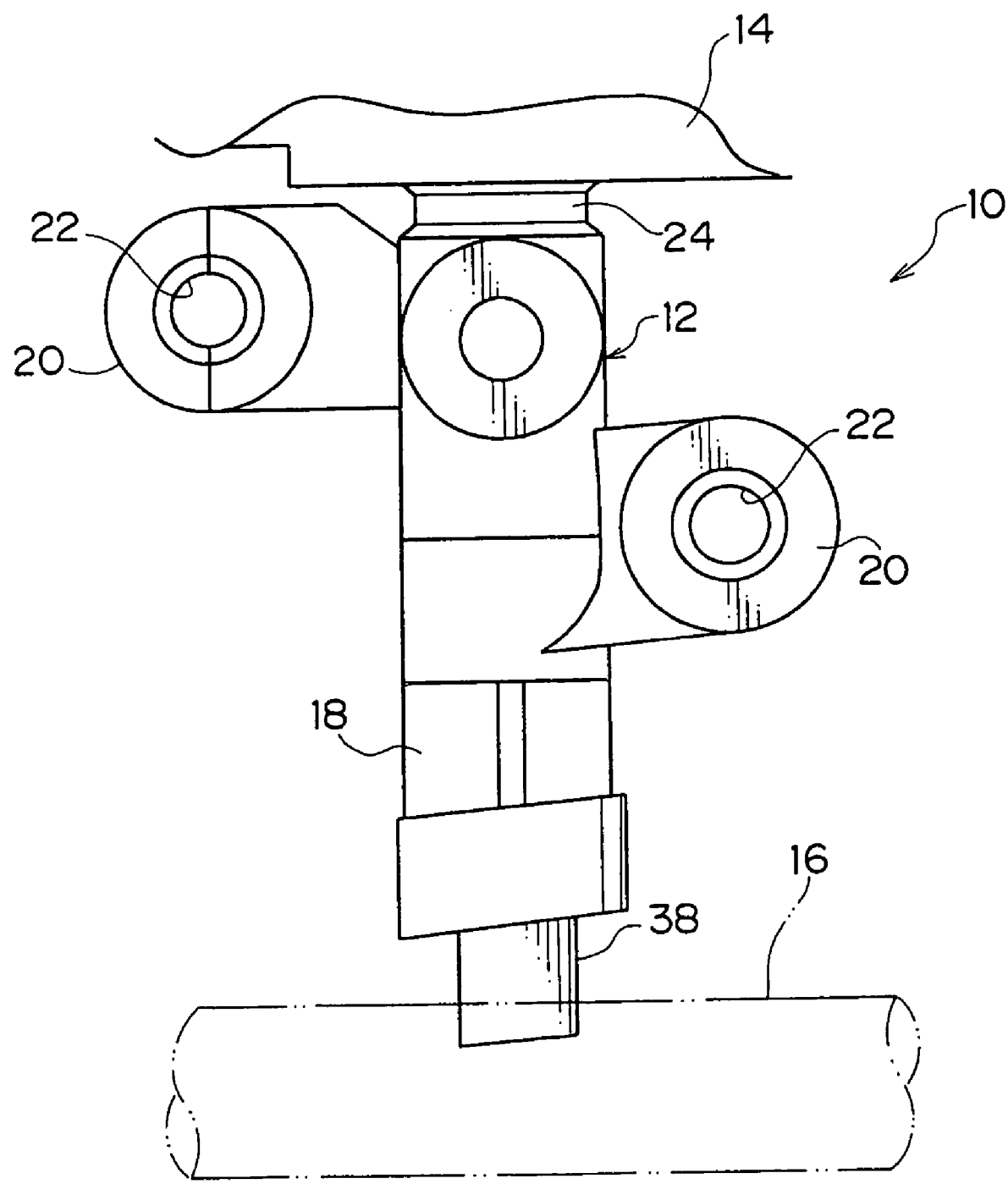
FIG. 2 is a rear view showing the overall structure of the electrically-driven steering lock device relating to the embodiment of the present invention.

As shown in FIG. 2, mounting portions 20, which are for mounting to the steering post, project from the outer peripheral portion of the guide portion 18 at both sides in the direction parallel to the steering shaft. The lock body 12 is mounted to the steering post by being fastened to the steering post by bolts (not illustrated) being inserted through mounting holes 22 formed in the mounting portions 20.

A groove-shaped connecting portion 24 is formed around the axis of the guide portion 18 at the border portion between the main body portion 14 and the guide portion 18. When impact of a predetermined value or more is applied to the lock body 12, the lock body 12 breaks with the connecting portion 24 being the starting point of the breakage, such that the lock body 12 is divided into the main body portion 14 and the guide portion 18.

A motor (not illustrated) which is a drive source, a cam portion (not illustrated) which is driven by the motor via a gear (not illustrated), and the like are accommodated in the main body portion 14. Electric power is supplied to the motor via an unillustrated wire disposed in the main body portion 14, such that the motor rotates forward and reversely.

Figure 4:
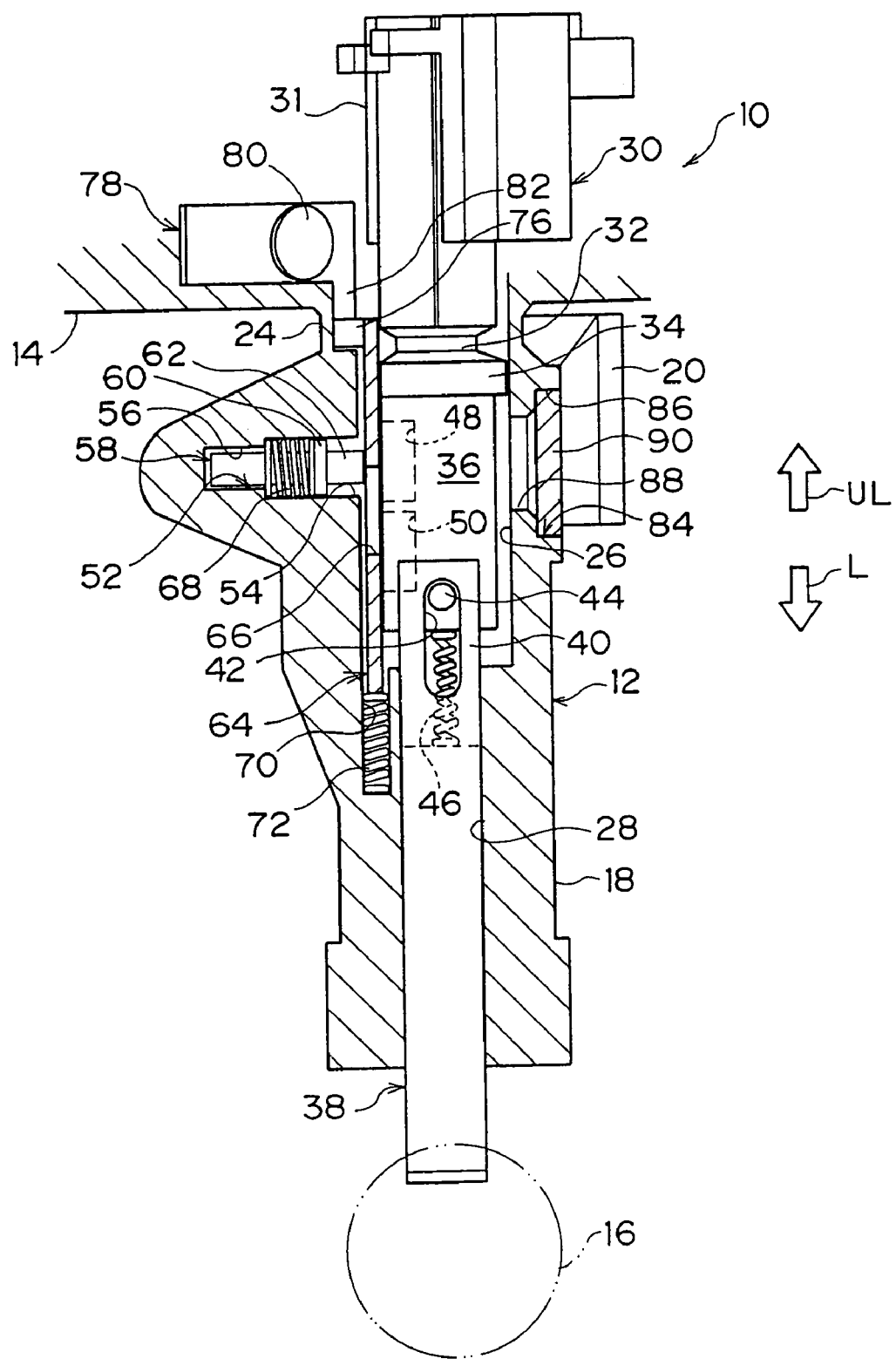
FIG. 4 is a partial sectional view showing the structure of main portions of the electrically-driven steering lock device relating to the embodiment of the present invention, in a state in which a steering shaft is locked.

As shown in FIG. 4, a step is formed the interior of the tube of the guide portion 18 such that a large diameter portion 26, whose cross-sectional configuration is round, and a small diameter portion 28, whose cross-sectional configuration is rectangular, are formed thereat. The large diameter portion 26 communicates with the interior of the main body portion 14. A rod-shaped lock stopper 30 is disposed so as to be movable along the inner wall of the large diameter portion 26 and a slide wall (not illustrated) formed within the main body portion 14, in a state in which the lock stopper 30 extends over the interior of the main body portion 14 and the interior of the large diameter portion 26. The lock stopper 30 is urged toward the steering shaft 16 (in the direction of arrow L in FIG. 4) by a spring (not illustrated) which is an urging means provided within the main body portion 14, and engages with the aforementioned cam portion within the main body portion 14. In accordance with the rotation of the cam portion which is driven by the aforementioned motor, the lock stopper 30 is moved in the direction of arrow L and in the direction of arrow UL.

Further, a groove-shaped brittle portion 32 is formed around the axis in the outer periphery of the longitudinal direction intermediate portion of the lock stopper 30, at a position corresponding to the connecting portion 24 of the lock body 12. When the lock body 12 is divided into the main body portion 14 and the guide portion 18 with the connecting portion 24 being the starting point of the division, the lock stopper 30 breaks with the brittle portion 32 being the starting point of the breakage, and is divided into a proximal end portion 31 at the main body portion 14 side and a distal end portion 36 at the guide portion 18 side.

A flange-shaped shielding portion 34, which projects around the axis, is formed at the outer periphery of the brittle portion 32 side end portion of the distal end portion 36. The outer diameter of the shielding portion 34 is formed to be slightly smaller than the inner diameter of the large diameter portion 26.

The portion of the distal end portion 36 further toward the distal end side (i.e., the lower side in FIG. 4) than the shielding portion 34 is formed so as to have a rectangular cross-sectional configuration, and is nipped between a pair of connecting portions 40, which project toward the proximal end side, of a rectangular-rod-shaped lock bar 38 which is provided so as to be movable along the small diameter portion 28 of the guide portion 18. The pair of connecting portions 40 are plate-shaped, and long holes 42 are formed in the substantially central portions thereof. The lock stopper 30 and the lock bar 38 are connected by projections 44, which project from the distal end portion 36, engaging with the interiors of the long holes 42. A spring 46 is provided between the lock stopper 30 and the lock bar 38, and urges the lock stopper 30 and the lock bar 38 in directions of moving apart from one another.

Here, when the motor is rotated forward, the lock stopper 30 is moved toward the guide portion 18 side of the lock body 12 (i.e., in the direction of arrow L in FIG. 4) by the rotation of the cam portion which is driven by the motor. In this way, the lock bar 38, which is connected to the lock stopper 30, moves in the direction of arrow L and projects out from the distal end of the guide portion 18 and engages with an engagement groove (not illustrated) formed in the steering shaft 16. Due to this engagement with the lock bar 38, the steering shaft 16 is locked so as to be unable to rotate (the state shown in FIG. 4).

When the motor is rotated reversely, the lock stopper 30 is moved, by the cam portion which is driven by the motor, toward the main body portion 14 side of the lock body 12 (i.e., in the direction of arrow UL in FIG. 5), against the urging force of the spring provided within the main body portion 14. In this way, the lock bar 38, which is connected to the lock stopper 30, moves in the direction opposite to the steering shaft 16 (i.e., moves in the direction of arrow UL), such that the locked state of the steering shaft 16 is released (the state shown in FIG. 5).

Figure 3:
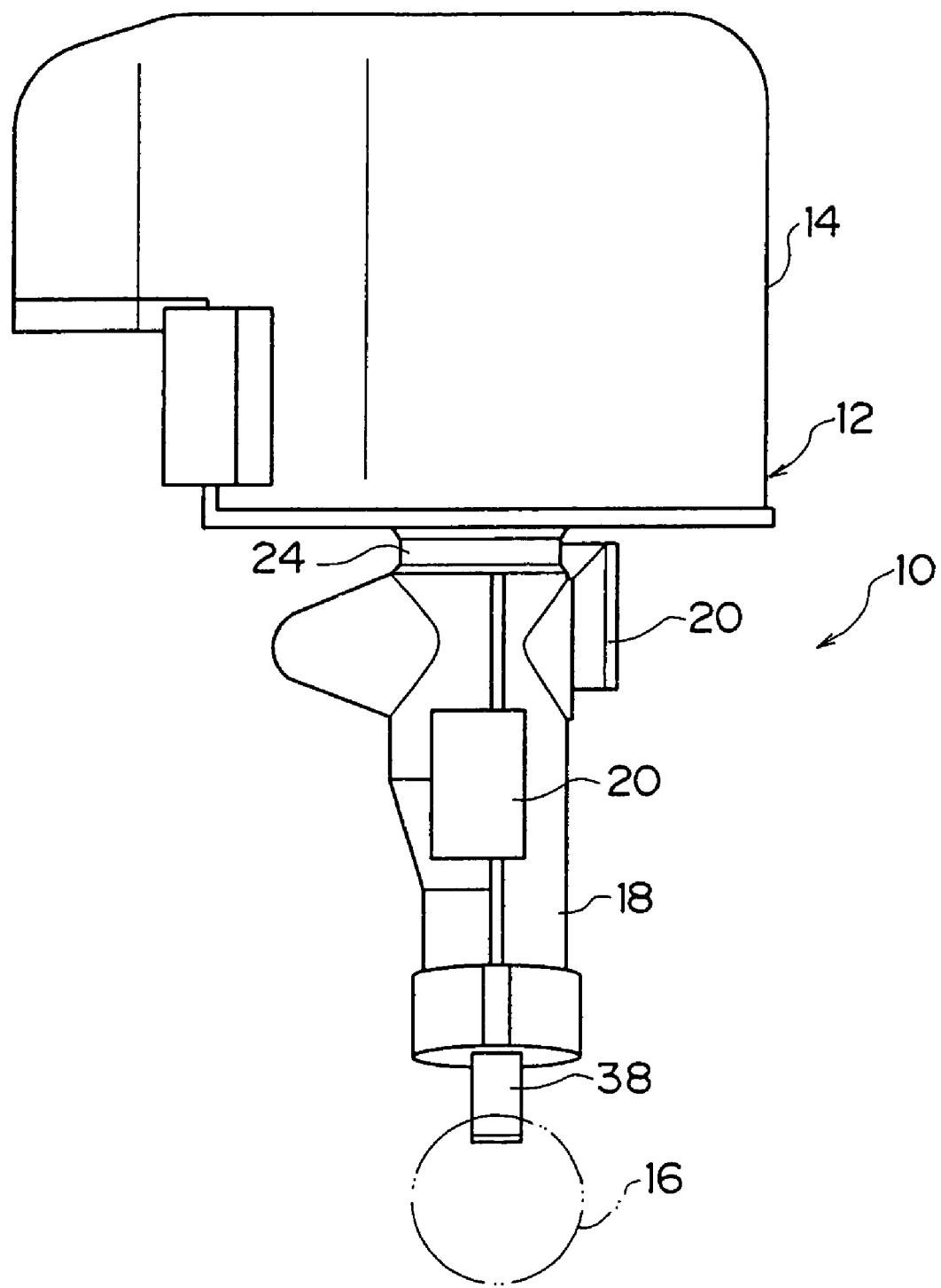
FIG. 3 is a side view showing the overall structure of the electrically-driven steering lock device relating to the embodiment of the present invention.

A fit-in hole 48 (at the upper side in FIG. 4), which is a fit-in concave portion and is a hole having a rectangular cross-sectional configuration, and a fit-in hole 50 (at the lower side in FIG. 4), which is a second fit-in concave portion and is a hole having a rectangular cross-sectional configuration, are provided so as to be lined up in the longitudinal direction of the lock stopper 30, in a side surface of the distal end portion 36 of the lock stopper 30 (the surface at the left side in FIG. 4). A hole 52, which is a hole having a circular cross-sectional configuration, is formed in the inner wall of the large diameter portion 26 at a position facing the fit-in hole 48 in the state in which the lock stopper 30 has moved to the guide portion 18 side of the lock body 12 in accordance with the rotation of the cam portion (i.e., in the state shown in FIG. 4). The outer wall of the guide portion 18 around the hole 52 projects in correspondence with the hole 52 (see FIG. 3).

Figure 6:
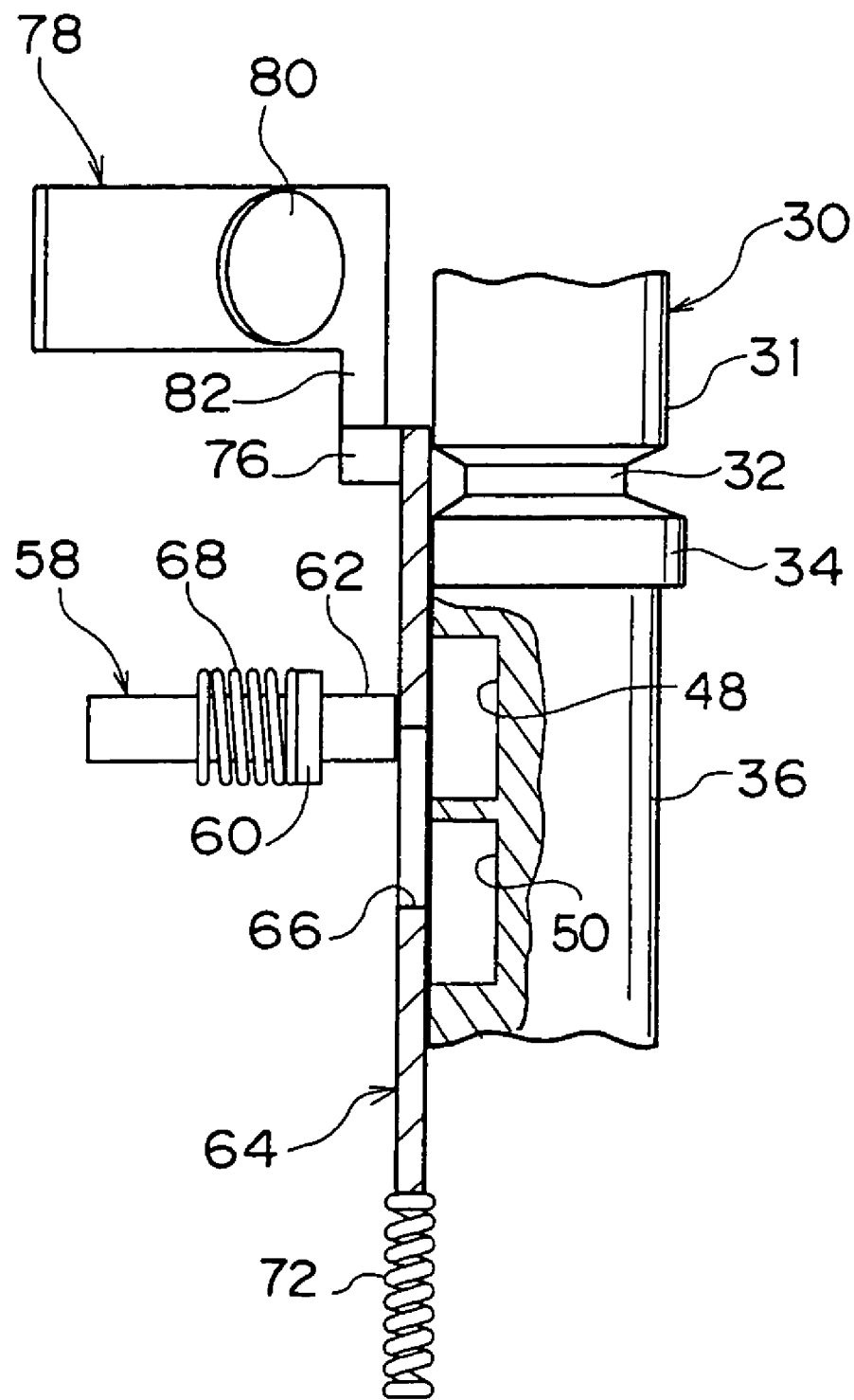
FIG. 6 is a partial sectional view showing the structure of main portions of the electrically-driven steering lock device relating to the embodiment of the present invention.

A step is formed in the hole 52 such that the hole 52 has a large diameter portion 54 and a small diameter portion 56. A lock pin 58, which is substantially solid-cylindrical, is inserted in the hole 52 so as to be movable along the inner wall of the hole 52. As shown in FIG. 6, the lock pin 58 has, at the longitudinal direction intermediate portion thereof, a flange-shaped flange portion 60 which projects from the outer periphery around the axis. The outer diameter of the portion of the lock pin 58, which portion is further toward the lock stopper 30 side than the flange portion 60, is formed so as to be slightly smaller than the hole widths of the fit-in hole 48 and the fit-in hole 50, and a fit-in portion 62, which can fit-in into the fit-in hole 48 and the fit-in hole 50, is formed thereat.

Figure 5:
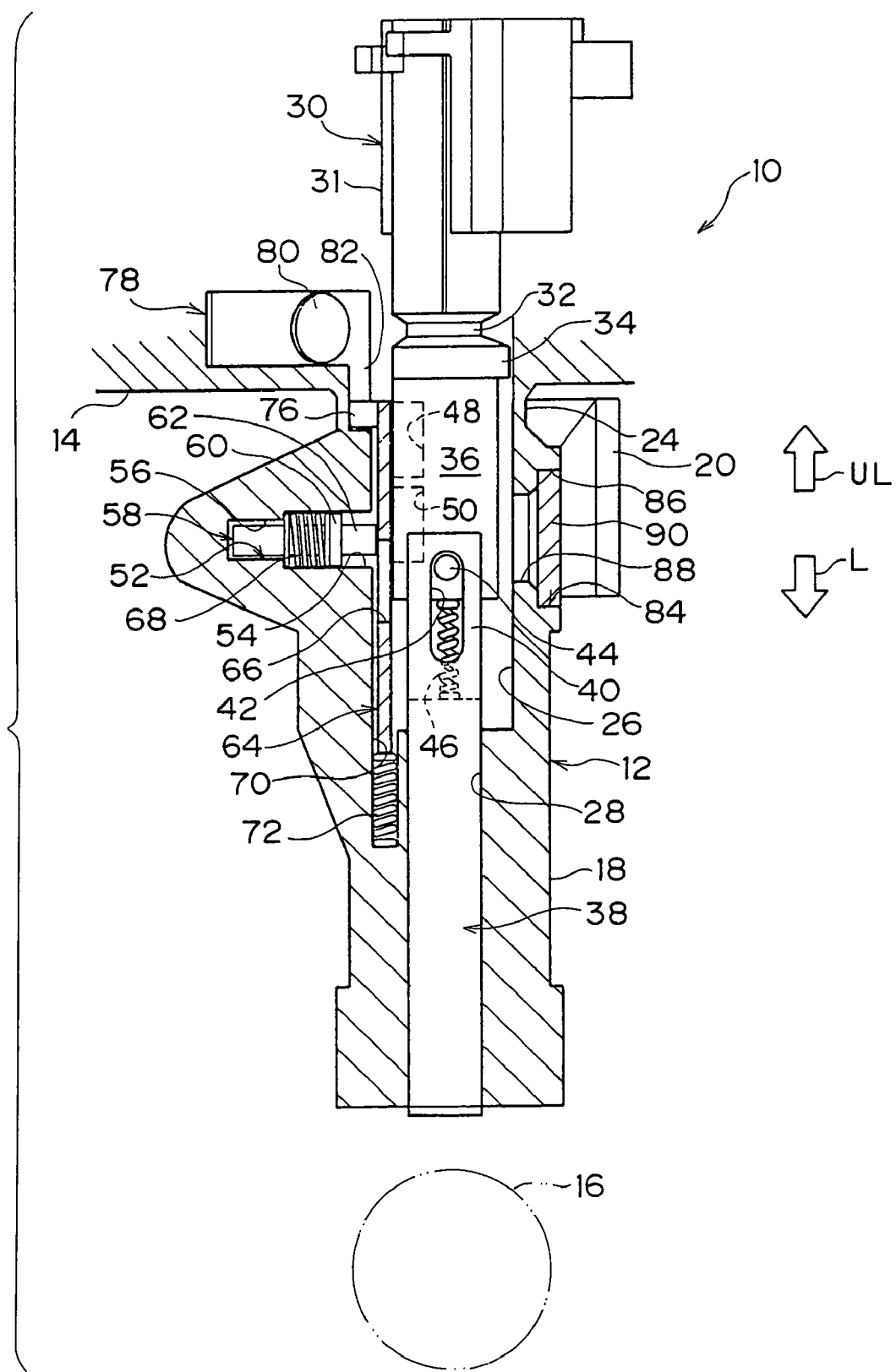
FIG. 5 is a partial sectional view showing the structure of main portions of the electrically-driven steering lock device relating to the embodiment of the present invention, in a state in which locking of the steering shaft is released.

The fit-in hole 50 is disposed at a position of the lock stopper 30 facing the fit-in portion 62 of the lock pin 58 in the state in which the lock stopper 30 has moved to the main body portion 14 side of the lock body 12 (i.e., in the state shown in FIG. 5). In the state in which the lock stopper 30 has moved to the guide portion 18 side of the lock body 12 (i.e., in the state shown in FIG. 4), the fit-in hole 48 is disposed at a position facing the fit-in portion 62 of the lock pin 58.

A spring 68 serving as an urging means is provided between the flange portion 60 of the lock pin 58 and the step portion of the hole 52. The lock pin 58 is urged toward the lock stopper 30 by the spring 68.

A movable plate 64, which is a thin plate which is substantially rectangular, is provided between the lock pin 58 and the lock stopper 30. The distal end of the fit-in portion 62 of the lock pin 58 abuts the movable plate 64 such that movement of the lock pin 58 toward the lock stopper 30 is impeded. As shown in FIGS. 8A through 8D, a rectangular through-hole 66 is formed in the central portion of the movable plate 64. The distal end of the fit-in portion 62 of the lock pin 58 which is abutting the movable plate 64 is in a state of catching on the edge of the through-hole 66. The hole width of the through-hole 66 is formed so as to be larger than the outer diameter of the fit-in portion 62 of the lock pin 58, and the fit-in portion 62 can be inserted through the through-hole 66.

A spring hole 70 is formed in the guide portion 18 at one longitudinal direction end side (the lower side in FIG. 4) of the movable plate 64. A spring 72 serving as an urging means is inserted in the spring hole 70. The movable plate 64 is urged toward the main body portion 14 by the spring 72.

As shown in FIGS. 8A through 8D, a groove portion 74 is formed in the end portion of the movable plate 64 at the side opposite the spring 72. An engaging edge portion 76, which is formed in the shape of a short strip and which is disposed at the main body portion 14 side of the movable plate 64 across the groove portion 74, is formed such that the attached root portion thereof is bent slightly (see FIG. 6 and FIG. 7).

Figure 7:
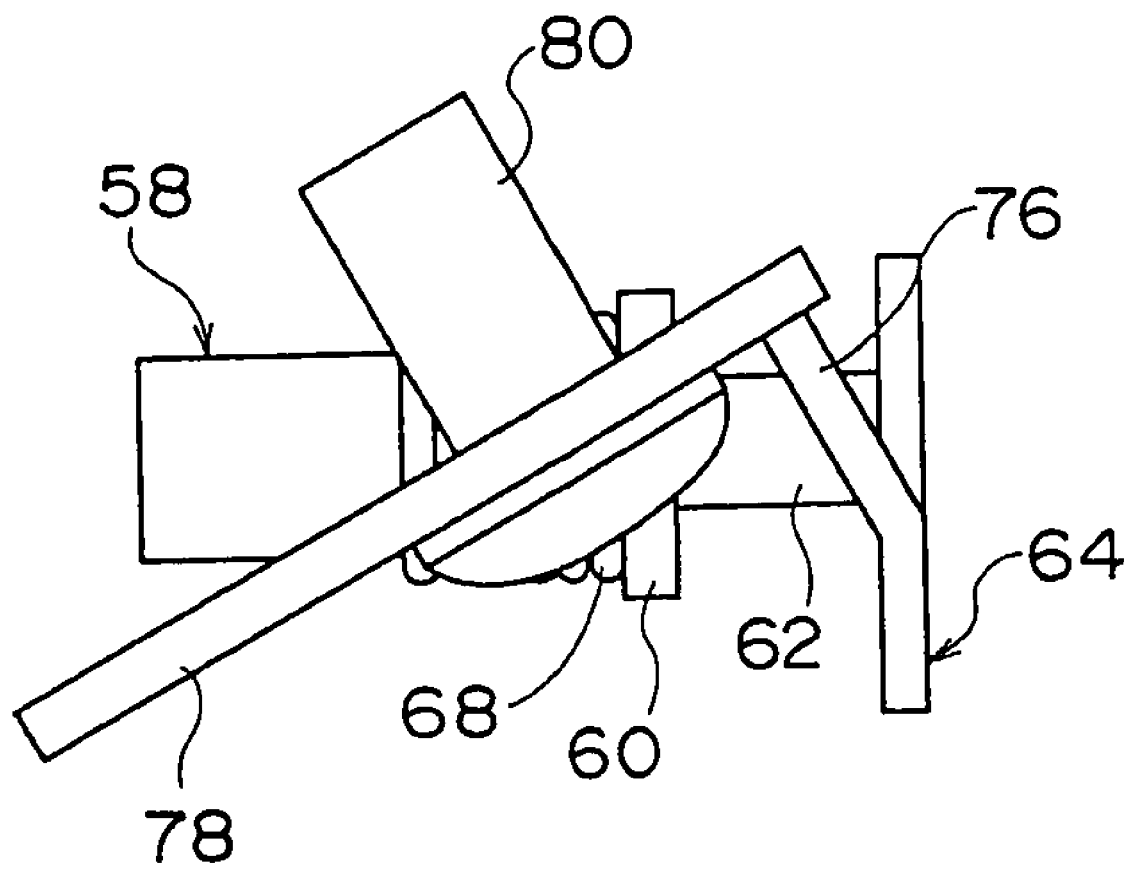
FIG. 7 is a top view showing the structures of a lock plate and a lock pin which are structural members of the electrically-driven steering lock device relating to the embodiment of the present invention.

A fixed plate 78, which is a thin plate formed in a substantial L shape, is provided at the main body portion 14 side of the movable plate 64. As shown in FIG. 4, the fixed plate 78 is fixed by a screw 80 to the main body portion 14. At the position corresponding to the connecting portion 24 of the lock body 12, the distal end of a projecting portion 82, which projects from one end of the fixed plate 78, catches slightly on the engaging edge portion 76 of the movable plate 64. Movement of the movable plate 64 toward the fixed plate 78 is thereby impeded. Further, as shown in FIG. 7, the fixed plate 78 is fixed to the main body portion 14 such that the longitudinal direction of the fixed plate 78 is a direction orthogonal to the engaging edge portion 76 of the movable plate 64.

As shown in FIG. 4, a cover hole 84, which is a hole having a circular cross-sectional configuration, is formed in the guide portion 18 at the side opposite the side where the lock pin 58 is provided, across the movable plate 64 and the distal end portion 36 of the lock stopper 30. A step is formed at the cover hole 84 such that a large diameter portion 86 and a small diameter portion 88 are formed. A disc-shaped cover 90 is press-fit into the large diameter portion 86.

Next, operation of the embodiment of the present invention will be described.

In the electrically-driven steering lock device 10 having the above-described structure, in the state in which the steering shaft 16 is locked by the lock bar 38 (the state shown in FIGS. 1 through 4), when current is supplied to the motor and the motor is rotated reversely, the cam portion is rotated. Due to the rotation of the cam portion, the lock stopper 30 is moved toward the main body portion 14 side of the lock body 12 (i.e., in the direction of arrow UL in FIG. 4), and the locking of the steering shaft 16 by the lock bar 38 is released.

Figure 10:
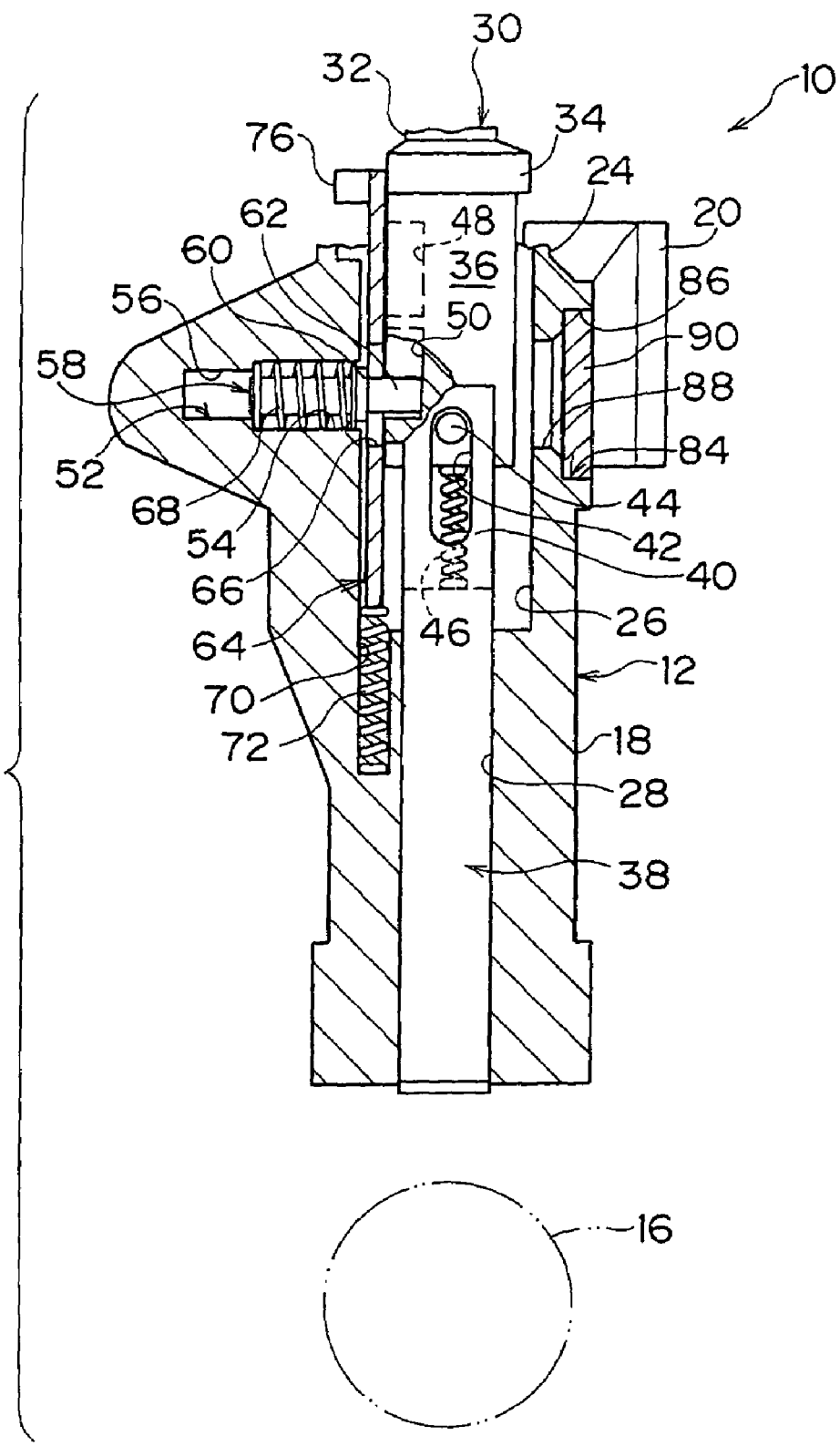
FIG. 10 is a partial sectional view showing the structure of main portions of the electrically-driven steering lock device relating to the embodiment of the present invention, in a state in which the lock body has been broken while the vehicle is traveling.

In this state in which locking is released, when, while the vehicle is traveling, the knee or the like of the driver collides with the main body portion 14 of the lock body 12 as the vehicle is suddenly braked and an impact of a predetermined value or more is applied to the main body portion 14, the lock body 12 breaks with the connecting portion 24 being the starting point of the breakage, and is divided into the main body portion 14 and the guide portion 18. Further, the lock stopper 30 also breaks with the brittle portion 32 being the starting point of the breakage, and is divided into the proximal end portion 31 and the distal end portion 36 (see FIG. 10). In this way, the impact which the knee or the like of the driver receives from the lock body 12 and the lock stopper 30 is mitigated.

Here, accompanying the division of the main body portion 14 and the guide portion 18, the fixed plate 78, which is fixed to the main body portion 14 by the screw 80, is cleared away together with the main body portion 14. Therefore, as shown in FIG. 8A, the movable plate 64, whose movement toward the fixed plate 78 has been impeded due to the engaging edge portion 76 engaging with the distal end of the projecting portion 82 of the fixed plate 78, moves due to the urging force of the spring 72 (refer to FIGS. 8B through 8D). Therefore, the fit-in portion 62 of the lock pin 58, which is urged toward the lock stopper 30 by the spring 68 and whose movement has been impeded by abutting the edge of the through-hole 66 formed in the central portion of the movable plate 64, is inserted through the through-hole 66 of the movable plate 64 and is fit into the fit-in hole 50 formed in the lock stopper 30 (the state shown in FIG. 10). In this way, movement of the distal end portion 36 of the lock stopper 30 and the lock bar 38 toward the steering shaft 16 is impeded. Therefore, even if the lock body 12 is broken while the vehicle is traveling, locking of the steering shaft 16 by the lock bar 38 is prevented.

In this way, in a case in which the lock body 12 breaks while the vehicle is traveling, the unlocked state of the steering shaft 16 is reliably maintained, and the safety at the time when the vehicle is traveling is improved.

On the other hand, when the steering shaft 16 is in an unlocked state (the state shown in FIG. 5), in order to park the vehicle, current is supplied to the motor and the motor is rotated forward so that the cam portion is rotated. Due to the rotation of the cam portion, the lock stopper 30 is moved toward the guide portion 18 side of the lock body 12 (i.e., in the direction of arrow L in FIG. 5), the lock bar 38 engages with the engagement groove (not illustrated) of the steering shaft 16, and the steering shaft 16 is locked (the state shown in FIGS. 1 through 4).

Note that, at the time when the lock bar 38 engages with the steering shaft 16, there are cases in which the positions of the lock bar 38 and the engagement groove of the steering shaft 16 are offset from one another, and the distal end of the lock bar 38 abuts the outer periphery of steering shaft 16, and movement of the lock bar 38 is restricted. In such a case, due to the spring 46, which is provided between the lock bar 38 and the lock stopper 30, contracting, movement of the lock stopper 30 toward the guide portion 18 is not restricted. Then, if the driver rotates the steering wheel such that the positions of the engagement groove and the lock bar 38 coincide with one another, the lock bar 38 engages with the engagement groove due to the urging force of the spring 46, and the steering shaft 16 is locked.

Figure 9:
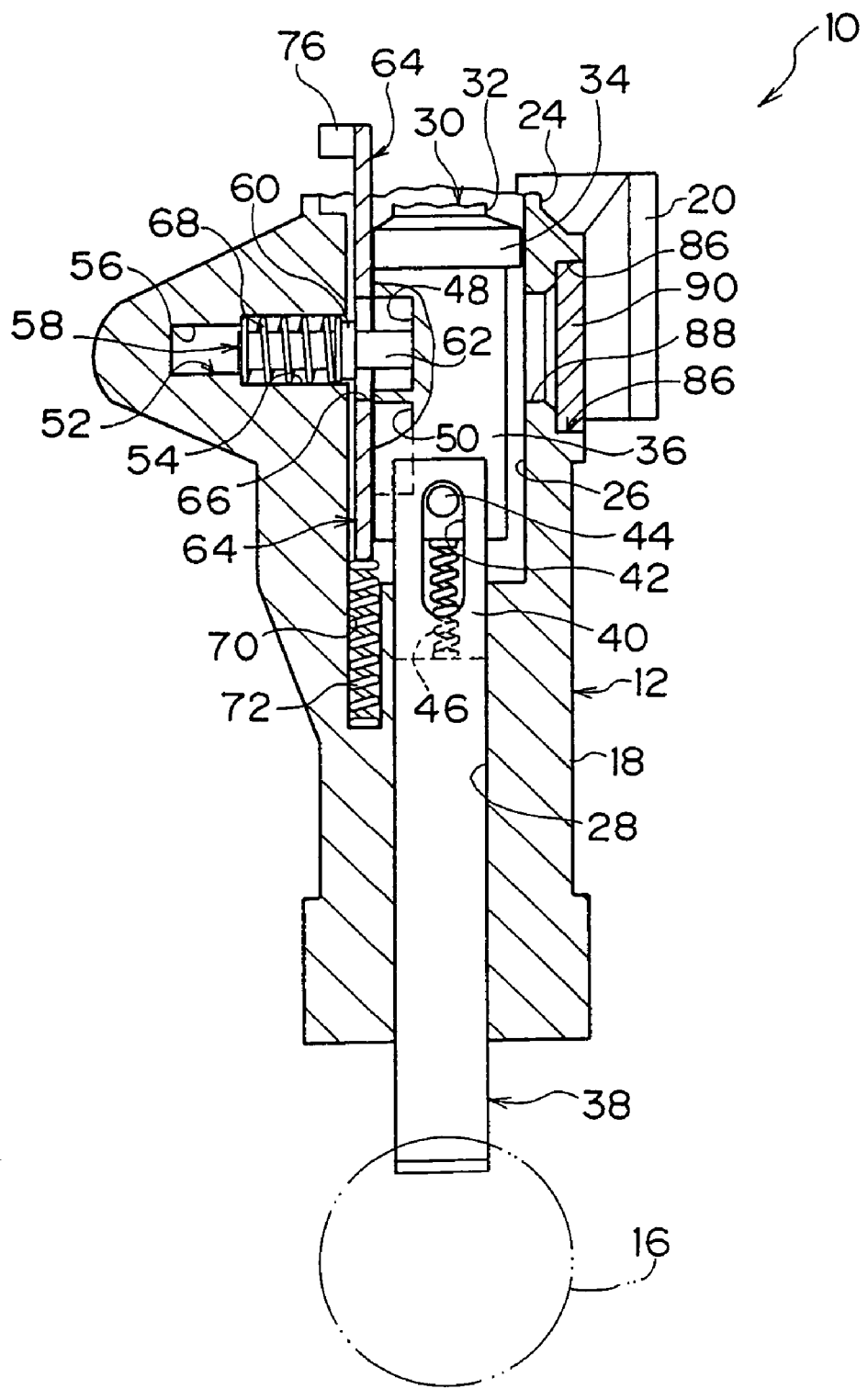
FIG. 9 is a partial sectional view showing the structure of main portions of the electrically-driven steering lock device relating to the embodiment of the present invention, in a state in which the lock body has been broken when the vehicle is parked.

In this locked state, when the lock body 12 is broken by an illegal act and an impact of a predetermined value or more is applied to the main body portion 14, the lock body 12 breaks with the connecting portion 24 being the starting point of the breakage, and is divided into the main body portion 14 and the guide portion 18. Further, the lock stopper 30 also breaks with the brittle portion 32 being the starting point of the breakage, and is divided into the proximal end portion 31 and the distal end portion 36 (see FIG. 9).

Here, accompanying the division into the main body portion 14 and the guide portion 18, the fixed plate 78, which is fixed to the main body portion 14 by the screw 80, also is cleared away together with the main body portion 14. Therefore, as shown in FIG. 8A, the movable plate 64, whose movement toward the fixed plate 78 has been impeded due to the engaging edge portion 76 engaging with the distal end of the projecting portion 82 of the fixed plate 78, moves due to the urging force of the spring 72 (refer to FIGS. 8B through 8D). Therefore, the fit-in portion 62 of the lock pin 58, which is urged toward the lock stopper 30 by the spring 68 and whose movement has been impeded by abutting the edge of the through-hole 66 formed in the central portion of the movable plate 64, is inserted through the through-hole 66 of the movable plate 64 and is fit into the fit-in hole 48 formed in the distal end portion 36 of the lock stopper 30 (the state shown in FIG. 9). In this way, movement of the distal end portion 36 toward the guide portion 18 proximal end side (i.e., upward in FIG. 9) is impeded. Therefore, it is possible to prevent the distal end portion 36 and the lock bar 30 from being pulled out from the guide portion 18 and the locking of the steering shaft 16 from being cancelled.

Moreover, because the lock pin 58, which is fit in the fit-in hole 48 of the lock stopper 30, is within the guide portion 18, even if the guide portion 18 is viewed from the exterior, it is difficult to learn of the mechanism and the position of the lock pin 58 which is impeding movement of the lock stopper 30.

In this state, the gap between the inner wall of the enlarged diameter portion 26 of the guide portion 18 and the lock stopper 30 is closed by the movable plate 64 and by the shielding portion 34 of the lock stopper 30. In the state in which the fit-in portion 62 of the lock pin 58 is inserted through the through-hole 66 of the movable plate 64, the fit-in portion 62 is fit in the fit-in hole 48 of the lock stopper 30. Therefore, it is also possible to prevent the movable plate 64 from being pulled out from the guide portion 18. In this way, it is possible to prevent a tool or the like from being inserted in and twisted in the gap between the large diameter portion 26 of the guide portion 18 and the lock stopper 30 and the lock pin 58 being broken, and the engagement of the lock pin 58 with the lock stopper from being cancelled.

In addition, as shown in FIGS. 6 and 7, movement of the movable plate 64 is impeded due to the distal end of the engaging edge portion 76 slightly engaging with the distal end of the projecting portion 82 of the fixed plate 78, and it is easy for the engagement of the movable plate 64 and the fixed plate 78 to be cancelled. Further, the movable plate 64 and the fixed plate 78 are engaged at a position corresponding to the connecting portion 24 of the lock body 12.

Therefore, even if an impact is applied to the lock body 12 and a slight crack arises between main body portion 14 and the guide portion 18 of the lock body 12, the engagement of the movable plate 64 and the fixed plate 78 is cancelled, and the lock pin 58 is fit in the fit-in hole 48 or the fit-in hole 50 of the lock stopper 30. Namely, even in a state in which the main body portion 14 and the guide portion 18 are not completely divided from one another, movement of the lock stopper 30 and the lock bar 38 is reliably impeded. Accordingly, it is extremely difficult to cancel the locked state of the steering shaft 16 by breaking the lock body 12, and the antitheft quality is good. Moreover, even in the rare case in which, while the vehicle is traveling, the lock body 12 were to break and a crack were to form between the main body portion 14 and the guide portion 18, the steering shaft 16 would not lock, and the safety is therefore good.

In this way, in the electrically-driven steering lock device 10 having the above-described structure, if the lock body 12 is broken while the vehicle is parked, the locked state of the steering shaft 16 is maintained. Further, canceling of the locked state by an illegal act is difficult, and the antitheft quality is therefore good.

Note that, in the above-described embodiment, the lock stopper 30 and the lock bar 38 are connected together as separate members. However, the present invention is not limited to the same, and the lock stopper 30 and the lock bar 38 may be formed integrally. In this case, the number of parts can be reduced, and the structure can be simplified.

Further, in the above-described embodiment, the fit-in hole 48 serving as the fit-in concave portion and the fit-in hole 50 serving as the second fit-in concave portion are provided at the lock stopper 30. However, the present invention is not limited to the same, and the fit-in concave portion and the second fit-in concave portion may be provided at the lock bar 38, and the lock pin 58 may be disposed so as to correspond to the fit-in concave portion and the second fit-in concave portion.

In the above-described embodiment, the connecting portion 24 is formed at the boundary portion between the main body portion 14 and the guide portion 18. However, the present invention is not limited to the same. The connecting portion may be formed at the lock body 12 at a position further toward the main body portion 14 side thereof (i.e., the side opposite the steering shaft 16) than the fit-in concave portion provided at the lock stopper 30 or the lock bar 38, and than the lock pin disposed at the guide portion.

Moreover, in the above-described embodiment, the fit-in hole 48 which is the fit-in concave portion and the fit-in hole 50 which is the second fit-in concave portion are holes having rectangular cross-sectional configurations. However, the configurations of the fit-in concave portion and the second fit-in concave portion are not limited provided that the fit-in concave portion and the second fit-in concave portion are structures (e.g., grooves or the like) which can impede movement of the lock stopper 30 by the lock pin 58 being fit therein.

Still further, in the above-described embodiment, the motor is used as the drive source, and the lock stopper 30 is moved by the cam portion being driven by the motor. However, a structure in which a screw is driven by a motor and the lock stopper 30 is moved by this screw mechanism, or a structure in which the lock stopper 30 is moved directly by a solenoid or the like, can be used.

As described above, in accordance with the electrically-driven steering lock device of the present invention, the locked state of a steering shaft can be reliably maintained in a case in which a lock body is broken while a vehicle is parked, and cancellation of this locked state due to an illegal act is difficult, resulting in the good antitheft quality.

What is claimed is:

1. An electrically-driven steering lock device comprising:
   a lock body having a main body portion in which a drive source is accommodated, and a guide portion which is tubular and which projects from the main body portion toward a steering shaft of a vehicle;
   a connecting portion enabling the lock body to divide when impact of a predetermined value or more is applied to the lock body;
   a lock stopper moving due to driving force from the drive source;
   a lock bar which is provided so as to be integrally movable with the lock stopper within the guide portion and whose proximal end portion is connected to the lock stopper, and in a state in which the lock stopper has been moved toward a guide portion side of the lock body, a distal end portion of the lock bar projects toward the steering shalt from a distal end of the guide portion and locks the steering shaft, and in a state in which the lock stopper has been moved toward a main body portion side of the lock body, the distal end portion of the lock bar moves in a direction opposite to the steering shaft and releases locking of the steering shaft;
   a lock plate having a trough-hole, and provided between the guide portion and the lock stopper so as to be movable toward the main body portion, and urged by an urging means toward the main body portion side such that movement of the lock plate toward the main body portion side is impeded due to the lock plate abutting the main body portion;
   a lock pin provided at the guide portion so as to be movable in a direction intersecting a direction of movement of the lock stopper, and urged toward the lock stopper by an urging means, movement of the lock pin toward the lock stopper being impeded due to the lock pin abutting an edge of the through-hole of the lock plate; and
   a fit-in concave portion formed at a position of the lock stopper which position faces the lock pin across the lock plate in a state in which the lock stopper has been moved toward the guide portion side of the lock body, the lock pin being able to fit in the fit-in concave portion.

2. The electrically-driven steering lock device of claim 1, wherein the lock plate and the urging means for urging the lock plate, and the lock pin and the urging means for urging the lock pin, are provided at the interior of the guide portion in a state of not being exposed.

3. The electrically-driven steering lock device of claim 1, wherein the lock stopper has another fit-in concave portion formed at a position of the lock stopper which position faces the lock pin across the lock plate when the lock stopper has been moved toward the main body portion side of the lock body, and the lock pin can fit in the other fit-in concave portion.

4. The electrically-driven steering lock device of claim 1, further comprising a brittle portion provided at a position of the lock stopper corresponding to the connecting portion, the brittle portion enabling the lock stopper itself to divide at a time when the lock body divides.

5. The electrically-driven steering lock device of claim 1, wherein the lock plate is structured so as to be divided into a fixed plate which is fixed to the main body portion, and a movable plate which has the through-hole in a central portion thereof, and which is provided so as to be movable toward the fixed plate between an inner wall of the guide portion and the lock stopper, and which is urged toward the fixed plate by the urging means, and
   movement of the movable plate toward the fixed plate is impeded due to an edge of the movable plate engaging with an edge of the fixed plate at a position corresponding to the connecting portion of the lock body.

6. The electrically-driven steering lock device of claim 5, wherein, in a state in which the lock stopper has been moved toward the guide portion side of the lock body, when impact of a predetermined value or more is applied to the lock body and the connecting portion breaks, the lock body is divided and engagement of the edge of the fixed plate and the movable plate is cancelled, and the movable plate thereby moves toward the fixed plate, and abutment of the lock pin and the edge of the through-hole of the movable plate is thereby cancelled, and the lock pin fits into the fit-in concave portion.

7. The electrically-driven steering lock device of claim 3, wherein the lock plate is structured so as to be divided into a fixed plate which is fixed to the main body portion, and a movable plate which has the through-hole in a central portion thereof, and which is provided so as to be movable toward the fixed plate between an inner wall of the guide portion and the lock stopper, and which is urged toward the fixed plate by the urging means, and
   movement of the movable plate toward the fixed plate is impeded due to an edge of the movable plate engaging with an edge of the fixed plate at a position corresponding to the connecting portion of the lock body.

8. The electrically-driven steering lock device of claim 7, wherein, in a state in which the lock stopper has been moved toward a main body portion side of the lock body, when impact of a predetermined value or more is applied to the lock body and the connecting portion breaks, the lock body divides and engagement of the edge of the fixed plate and the movable plate is cancelled, and the movable plate thereby moves toward the fixed plate, and abutment of the lock pin and the edge of the through-hole of the movable plate is thereby cancelled, and the lock pin fits into the other fit-in concave portion.

9. The electrically-driven steering lock device of claim 4, wherein the fit-in concave portion is positioned at the lock stopper further toward the steering shaft than the brittle portion is.

10. The electrically-driven steering lock device of claim 9, wherein the lock stopper has a shielding portion which is provided between the brittle portion and the fit-in concave portion, and whose outer diameter is slightly smaller than a diameter of the guide portion in a vicinity of the shielding portion.

11. The electrically-driven steering lock device of claim 3, further comprising a brittle portion provided at a position of the lock stopper corresponding to the connecting portion, the brittle portion enabling the lock stopper itself to divide at a time when the lock body divides.

12. The electrically-driven steering lock device of claim 11, wherein the other fit-in concave portion is positioned at the lock stopper further toward the steering shaft than the brittle portion and the fit-in concave portion are.

13. The electrically-driven steering lock device of claim 1, wherein a connecting portion, which connects a proximal end portion of the lock bar and the lock stopper, is able to extend and contract along the guide portion.

14. An electrically-driven steering lock device comprising:

a lock body having a main body portion in which a drive source is accommodated, and a guide portion which is tubular and which projects from the main body portion toward a steering shaft of a vehicle;

a connecting portion enabling the lock body to divide when impact of a predetermined value or more is applied to the lock body; and a lock stopper moving in a state of extending over the main body portion and the guide portion, due to driving force from the drive source, the lock stopper including a first fit-in concave portion formed at a position of the lock stopper further toward the steering shaft than a position substantially corresponding to the connecting portion;

a lock bar which is provided so as to be integrally movable with the lock stopper within the guide portion, and in a state in which the lock stopper has been moved toward a guide portion side of the lock body, a distal end portion of the lock bar projects toward the steering shaft from a distal end of the guide portion and locks the steering shaft, and in a state in which the lock stopper has been moved toward a main body portion side of the lock body, the distal end portion of the lock bar moves in a direction opposite to the steering shalt and releases locking of the steering shaft;

a lock plate having a through-hole, and provided between the guide portion and the lock stopper so as to be movable toward the main body portion, and urged by an urging means toward the main body portion side, such that movement of the lock plate toward the main body portion side is impeded due to the lock plate abutting the main body portion; and a lock pin provided at the guide portion so as to be movable in a direction intersecting a direction of movement of the lock stopper, and urged toward the lock stopper by an urging means, wherein the first fit-in concave portion is formed, such that the lock pin can fit therein, at a position of the lock stopper which position faces the lock pin across the lock plate in a state in which the lock stopper has been moved toward the guide portion side of the lock body, in the state in which the lock stopper has been moved toward the guide portion side of the lock body, the lock pin abuts an edge of the through-hole of the lock plate, and movement of the lock pin toward the lock stopper is thereby impeded, and when impact of a predetermined value or more is applied to the lock body and the connecting portion breaks, the lock body is divided and impeding of movement of the lock plate toward the main body portion side is cancelled and the lock plate moves toward the main body portion side, and abutment of the lock pin and the edge of the through-bole of the lock plate is thereby cancelled, and the lock pin fits into the first fit-in concave portion.

15. The electrically-driven steering lock device of claim 14, wherein the lock stopper further includes a second fit-in concave portion formed further toward a steering shaft side of the lock stopper than the first fit-in concave portion is.

16. The electrically-driven steering lock device of claim 15, wherein the second fit-in concave portion is formed, such that the lock pin can fit therein, at a position of the lock stopper which position faces the lock pin across the lock plate in a state in which the lock stopper has been moved toward the main body portion side of the lock body, in the state in which the lock stopper has been moved toward the main body portion side of the lock body, the lock pin abuts the edge of the through-hole of the lock plate, and movement of the lock pin toward the lock stopper is thereby impeded, and when impact of a predetermined value or more is applied to the lock body and the connecting portion breaks, the lock body is divided and impeding of movement of the lock plate toward the main body portion side is cancelled and the lock plate moves toward the main body portion side, and abutment of the lock pin and the edge of the through-hole of the lock plate is thereby cancelled, and the lock pin fits into the second fit-in concave portion.

17. The electrically-driven steering lock device of claim 14, wherein the lock plate and the urging means for urging the lock plate, and the lock pin and the urging means for urging the lock pin, are provided at the interior of the guide portion in a state of not being exposed.

18. The electrically-driven steering lock device of claim 14, wherein the lock plate is structured so as to be divided into a fixed plate which is fixed to the main body portion, and a movable plate which has the through-hole in a central portion thereof, and which is provided so as to be movable toward the fixed plate between an inner wall of the guide portion and the lock stopper, and which is urged toward the fixed plate by the urging means, and movement of the movable plate toward the fixed plate is impeded due to an edge of the movable plate engaging with an edge of the fixed plate at a position corresponding to the connecting portion of the lock body.

19. The electrically-driven steering lock device of claim 14, wherein the lock stopper has a shielding portion which is provided between the first fit-in concave portion and a position of the lock stopper substantially corresponding to the connecting portion, and whose outer diameter is slightly smaller than a diameter of the guide portion in a vicinity of the shielding portion.

20. The electrically-driven steering lock device of claim 14, wherein a connecting portion, which connects the lock bar and the lock stopper, is able to extend and contract along the guide portion.

* * * * *